(12) United States Patent  
Ford

(10) Patent No.: US 10,533,480 B2  
(45) Date of Patent: Jan. 14, 2020

(54) HIGH PRESSURE HOT AIR HEATER

(71) Applicant: Darrell Ford, Spruce Grove (CA)

(72) Inventor: Darrell Ford, Spruce Grove (CA)

( * ) Notice: Subject to any disclaimer, the term of this patent is extended or adjusted under 35 U.S.C. 154(b) by 185 days.

(21) Appl. No.: 15/636,253

(22) Filed: Jun. 28, 2017

(65) Prior Publication Data

US 2017/0370265 A1  Dec. 28, 2017

Related U.S. Application Data

(60) Provisional application No. 62/355,763, filed on Jun. 28, 2016.

(51) Int. Cl.
*F01N 5/02* (2006.01)
*F04B 17/05* (2006.01)
*F24H 3/04* (2006.01)

(52) U.S. Cl.
CPC .............. *F01N 5/02* (2013.01); *F04B 17/05* (2013.01); *F24H 3/0488* (2013.01); *F04B 2205/10* (2013.01)

(58) Field of Classification Search
CPC .... F01N 5/02; F01N 5/00; F04B 17/05; F04B 35/002; F24H 3/0488; Y02B 30/28; F02B 47/08; F02B 47/10; F02M 15/027; F02M 2025/0881; F02M 31/042; F02M 31/06; F02M 31/087

See application file for complete search history.

(56) References Cited

U.S. PATENT DOCUMENTS

| 4,453,524 A * | 6/1984 | Lee .......................... F02B 39/10 123/549 |
| 2011/0036335 A1* | 2/2011 | Wood ...................... F02B 33/44 123/568.21 |

* cited by examiner

*Primary Examiner* — Jacob M Amick

(57) ABSTRACT

A flameless industrial air heater comprising: a combustion engine having a drive shaft and a combustion exhaust gas conduit to direct hot exhaust gases away from the engine; a mixing chamber having an air inlet and being in fluid communication with the exhaust gas conduit to mix the hot exhaust gasses with air flowing into the mixing chamber to produce a warmed air stream; and a compressor connected to the drive shaft and being driven thereby, the compressor being downstream of the mixing chamber to receive the warmed air stream and to pressurize the warmed air stream for delivery to applications requiring heating.

12 Claims, 2 Drawing Sheets

HIGH PRESSURE HOT AIR HEATER

FIELD OF THE INVENTION

The present invention relates to a highly efficient high pressure hot air heater capable of delivering air at temperatures and pressures allowing for the replacement of traditional mobile industrial boilers used in heating applications. The apparatus disclosed is able to deliver high temperature and high pressure air to applications requiring heat energy, such as for example the heating of work-spaces, buildings, structures or tarped in areas and the like; the heating of industrial fluids via heat-exchanger coils located inside of large storage tanks or vessels; the heating of fluids in a storage tanks by direct injection of the high temperature/ high pressure air into the target fluid thereby raising its temperature. Other applications of the present invention will be apparent and the foregoing list is not meant to be exhaustive.

BACKGROUND OF THE INVENTION

Portable industrial steam boilers such as those sold and or operated by a variety of companies are widely used in many sectors of the economy including the northern oil and gas industry, to provide the supplemental heat energy needed to make various activities possible when in cold climates and temperatures often associated with the geography where these types of industries operate. This needed supplemental heat energy is often delivered by the use of portable steam boilers which deliver heat energy in the form of high temperature and high pressure steam used in a variety of areas ranging from supplying space or building heat via heat exchangers, to direct contact applications where the high temperature steam is directly applied to the object to be heated—ie: an oil-field well-head. Portable industrial steam boilers are capable of supplying the 'heat' energy using steam as a high temperature and relatively high pressure medium allowing for delivery of the heat energy over long distances; multiple locations originating from a single 'boiler' unit through the use of headers and then multiple smaller delivery lines. Steam boilers also have the advantage of delivering a 'fameless' form of heat energy to sensitive locations in that the boiler unit can be located at safe distances away from the sensitive application or source of combustion and only the hot water or steam is delivered to the sensitive area allowing for a completely flameless delivery of heat energy. On the other hand, boilers are thermally inefficient systems and require significant expertise to operate; use significant amounts of clean and fresh water; use water/steam as the heat delivery medium which can be problematic when used in direct applications and at cold temperatures (freezing and icing caused by water residue); water must be 'returned' and re-cycled in closed loop applications such as heat-exchangers or radiant heaters.

Accordingly, there is a need for an improved flameless heat delivery system that is able to deliver similar temperatures and pressures to those of a steam boiler but with much higher efficiencies and without the use of water or steam as the delivery medium.

SUMMARY OF THE INVENTION

The present invention provides a flameless high temperature hot air heater that provides high pressure and high temperature air as a heating medium by employing the direct recirculation of the otherwise wasted drive engine exhaust heat. The system delivers a much higher level of thermal efficiency over traditional fire tube or water tube boilers and requires significantly less input energy to reach the required pressures and temperatures, thus resulting in the opportunity to employ less expensive equipment operable by lower skilled persons (no steam certification required in some jurisdictions), which does not consume clean fresh water that is ultimately wasted, and which can be used for direct contact heating of water or other fluids due to the use of air as the delivery medium that can be simply vented once the heat is transferred into the target liquid, thus avoiding the co-mingling of steam/water with the fluid being heated. The system will operate at pressures in the range of 1 psig and 15 psig, preferably in the range of 8 psig and 15 psig and at temperatures at 180° F. or 250° F. and will require significantly less energy per btu of heat energy delivered to the applications than traditional steam boilers.

Accordingly, in some aspects the present invention provides a flameless industrial air heater comprising: a combustion engine having a drive shaft and a combustion exhaust gas conduit to direct hot exhaust gases away from the engine; a mixing chamber having an air inlet and being in fluid communication with the exhaust gas conduit to mix the hot exhaust gasses with air flowing into the mixing chamber to produce a warmed air stream; a compressor connected to the drive shaft and being driven thereby, the compressor being downstream of the mixing chamber to receive the warmed air stream and to pressurize the warmed air stream, and a delivery conduit downstream of the compressor to deliver the pressurized warmed air stream to applications requiring heating that are external to the combustion engine wherein the pressurized warmed air stream is directed away from the combustion engine and used as heating in the applications.

In some embodiments, the apparatus may further comprise a valve downstream of the compressor to maintain back pressure on the compressor.

In some embodiments, the apparatus may further comprise a radiator with a forced air circulation therethrough operable to provide liquid cooling to the engine and a source of warm radiation air; and a second warm air conduit to direct the warm radiation air to mix with the warmed air stream at a location upstream of the compressor.

In some embodiments, the back pressure may be in the range of about 1-15 psig.

In some embodiments, the compressor may be a positive displacement lobe type blower. In some embodiments, the back pressure may be in the range of about 8-15 psig.

In some aspects, the present invention provides a flameless industrial air heater comprising: a combustion engine having a drive shaft and a combustion exhaust gas conduit to direct hot exhaust gases away from the engine; a heat exchanger in fluid communication with the combustion exhaust gas conduit on a first side and an air stream on a second side to transfer heat from hot exhaust gas to the air stream to produce a warmed air stream; and a compressor connected to the drive shaft and being driven thereby, the compressor being downstream of the heat exchanger to receive the warmed air stream and to pressurize the warmed air stream, and a delivery conduit downstream of the compressor to deliver the pressurized warmed air stream to applications requiring heating that are external to the combustion engine wherein the pressurized warmed air stream is directed away from the combustion engine and used as heating in the applications.

In some embodiments, the apparatus may further comprise a valve downstream of the compressor to maintain back pressure on the compressor.

In some embodiments, the back pressure may be in the range of about 1-15 psig.

In some embodiments, the apparatus may further comprise: a radiator with a forced air circulation therethrough operable to provide liquid cooling to the engine and a source of warm radiation air; and a mixing chamber in fluid communication with the warm radiation air to mix the warm radiation air with the air stream or the warmed air stream at a location upstream of the compressor.

In some embodiments, the compressor may be a positive displacement lobe type blower. In some embodiments, the back pressure may be in the range of about 8-15 psig.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

These and other features of the invention will become more apparent from the following description in which reference is made to the appended drawings and wherein.

DETAILED DESCRIPTION

Figure 1:
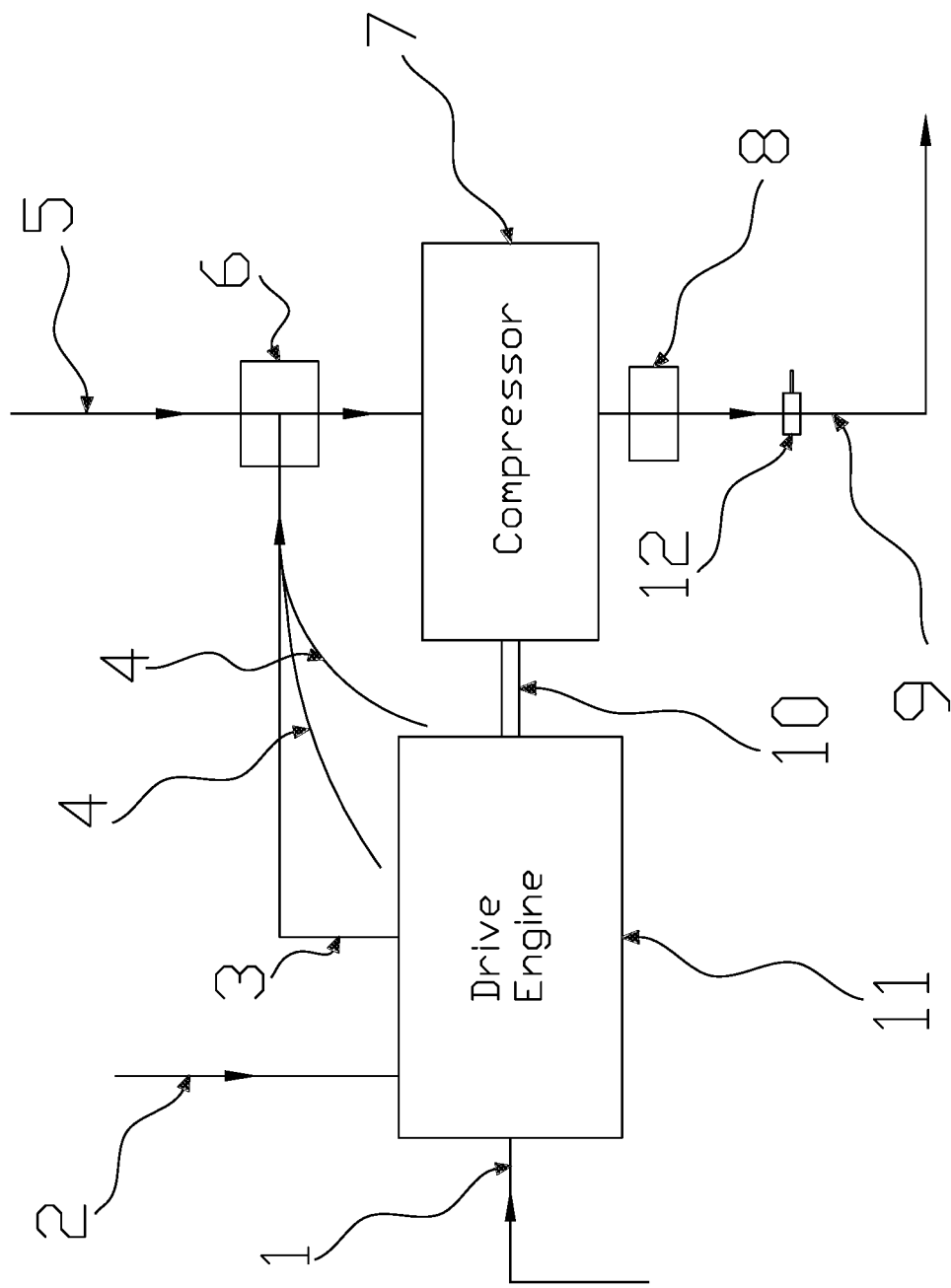
FIG. 1 is a process flow diagram according to the present invention.

Referring to FIG. 1, the system generally comprises of commercially available internal combustion engine 11, such as a piston engine, that drives via a drive shaft 10 a mechanically driven high pressure compressor that may be a blower 7 such as a positive displacement lobe type blower, for example a Dresser Roots blower specifically configured to work with air as the working fluid. The compressor or blower 7 operates at pressures typically in the range of 1 psig but not higher than 15 psig, preferably in the range of 8 psig to 15 psig, and at temperatures +/−180° F. but not above 240° F. The engine 11 drives the blower 7 via a drive shaft 10. The blower 7 draws the product air in via conduit 5 and through mixing chamber 6 with the inlet to the blower remaining under a slight vacuum due to work being done by the blower. The engine is supplied with outside air via conduit 2 and the necessary fuel via fuel delivery path 1. High temperature exhaust produced as a by-product of the engine performing work on the shaft 10 to the blower travels via exhaust gas conduit 3 and mixes with the warm radiation air produced from the engine coolant and radiation 4 and after being drawn into to the mixing chamber 6 and then into the inlet of the blower 7, is compressed and sent to the application as product air. In some embodiments, the warm radiation air produced from the engine coolant and radiation 4 may be omitted.

The warmed air mixture enters the inlet of the blower at higher than ambient temperatures due to the mixing of the high temperature exhaust (can be in the range of 400° F. to 1000° F.) with the mid temperature coolant/radiant air 4 (can be at 60° F. to 100° F.) with outside ambient air. Further, and to increase the air temperature to desired target levels, the blower is operated under a back pressure created and controlled by a back pressure valve 8 located on the outlet of the blower. The valve is operated in such a way as to maintain the necessary amount of back-pressure in the blower required to place an adequate mechanical load on the blower and in turn the engine resulting in an increase to the temperature of the air/exhaust mixture by performing work on the air moving through the blower thereby elevating the outlet or product air to the desired target temperature, usually in the range of 180° F. The back pressure valve 8 can be controlled by any number of commercially available controllers such as valves actuators and PLC type equipment. The valve is throttled by a PLC control unit in response to the set point of the system as compared with the outlet temperature reading from temperature sensor 12. If temperature is low, the valve will progressively close, creating more backpressure which requires more work, which heats the air through the blower as well as the exhaust temperature coming from the engine—both combining to produce the desired air temperature at the outlet of the blower and then to the application via conduit 9.

Figure 2:
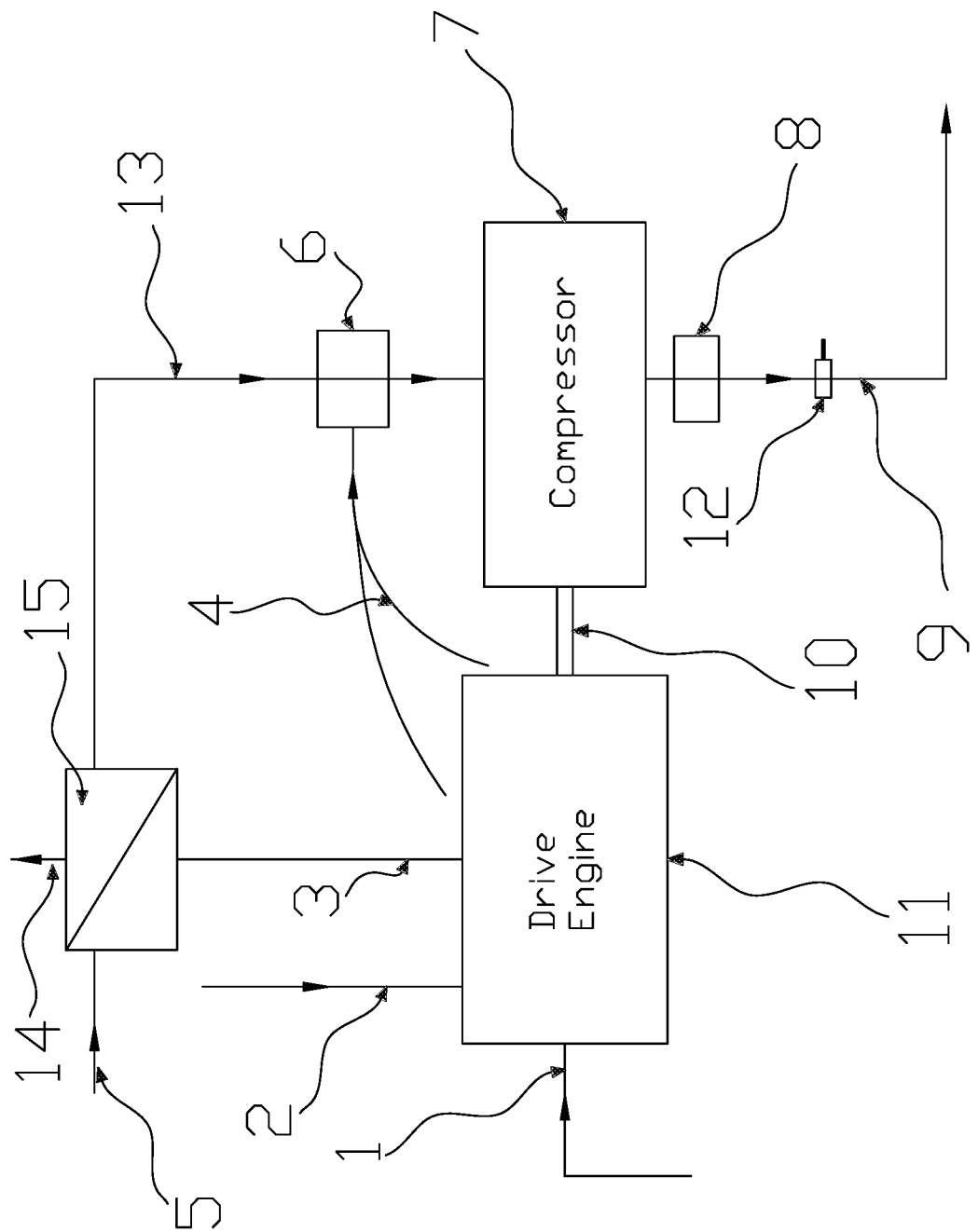
FIG. 2 is a process flow diagram according to another embodiment of the present invention.

Referring to FIG. 2, in another embodiment the system generally comprises the apparatus as described in relation to FIG. 1 but including a heat exchanger 15 in between the exhaust gas conduit 3 and the blower 7. The blower 7 draws the air in via conduit 5 and through one side of a heat exchanger 12. High temperature exhaust produced as a by-product of the engine 11 performing work on the shaft to the compressor 10 travels via conduit 3 and into another side of the heat exchanger 12 where it transfers its heat energy to the air stream from conduit 5 thereby pre-heating the air stream to produce a warmed air stream, which then travels via conduit 13 into mixing chamber 6 as a result of the inlet to the blower being under a slight vacuum due to work being done by the blower. In the mixing chamber 6 the warmed air flow mixes with the warm radiation air produced from the engine coolant and radiation 4 and after being drawn into to the mixing chamber 6 and then into the inlet of the blower 7, the warmed air mixture is compressed and sent to the application as product air. The exhaust from the engine exits heat exchanger 12 via vent 14. The mixed warmed air mixture entering the inlet of the blower is at higher than ambient temperatures due to the heat absorbed from the high temperature exhaust from the IC engine (can be in the range 400° F. to 1000° F.) via heat exchanger 12 and the mixing with the mid temperature coolant/radiant air 4 (can be at 60° F. to 100° F.) in mixing chamber 6. Further, and to increase the air temperature to desired target levels, the compressor is operated under a back pressure as described herein in relation to FIG. 1. In some embodiments, the warm radiation air produced from the engine coolant and radiation 4 and the mixing chamber 6 may be omitted such that the warmed air stream from the heat exchanger 15 flows directly via conduit 13 to the inlet of the compressor.

It will be appreciated by those skilled in the art that the preferred and alternative embodiments have been described in some detail but that certain modifications may be practiced without departing from the principles of the invention.

What is claimed is:

1. A flameless industrial air heater comprising:
   a combustion engine having a drive shaft and a combustion exhaust gas conduit to direct hot exhaust gases away from the engine;
   a mixing chamber having an air inlet and being in fluid communication with the exhaust gas conduit to mix the hot exhaust gasses with air flowing into the mixing chamber to produce a warmed air stream;
   a compressor connected to the drive shaft and being driven thereby, the compressor being downstream of the mixing chamber to receive the warmed air stream and to pressurize the warmed air stream; and a delivery conduit downstream of the compressor to deliver the pressurized warmed air stream to applications requiring heating that are external to the combustion engine wherein the pressurized warmed air stream is directed away from the combustion engine and used as heating in the applications.

2. The apparatus of claim 1 further comprising a valve downstream of the compressor to maintain back pressure on the compressor.

3. The apparatus of claim 2 further comprising:
a radiator with a forced air circulation therethrough operable to provide liquid cooling to the engine and a source of warm radiation air; and
a second warm air conduit to direct the warm radiation air to mix with the warmed air stream at a location upstream of the compressor.

4. The apparatus of claim 2 wherein the back pressure is in the range of about 1 - 15 psig.

5. The apparatus of claim 4 wherein the compressor is a positive displacement lobe type blower.

6. The apparatus of claim 5 wherein the back pressure is in the range of about 8 - 15 psig.

7. A flameless industrial air heater comprising:
a combustion engine having a drive shaft and a combustion exhaust gas conduit to direct hot exhaust gases away from the engine;
a heat exchanger in fluid communication with the combustion exhaust gas conduit on a first side and an air stream on a second side to transfer heat from hot exhaust gas to the air stream to produce a warmed air stream;
a compressor connected to the drive shaft and being driven thereby, the compressor being downstream of the heat exchanger to receive the warmed air stream and to pressurize the warmed air stream; and
a delivery conduit downstream of the compressor to deliver the pressurized warmed air stream to applications requiring heating that are external to the combustion engine wherein the pressurized warmed air stream is directed away from the combustion engine and used as heating in the applications.

8. The apparatus of claim 7 further comprising a valve downstream of the compressor to maintain back pressure on the compressor.

9. The apparatus of claim 8 wherein the back pressure is in the range of about 1 - 15 psig.

10. The apparatus of claim 8 further comprising:
a radiator with a forced air circulation therethrough operable to provide liquid cooling to the engine and a source of warm radiation air; and
a mixing chamber in fluid communication with the warm radiation air to mix the warm radiation air with the air stream or the warmed air stream at a location upstream of the compressor.

11. The apparatus of claim 9 wherein the compressor is a positive displacement lobe type blower.

12. The apparatus of claim 11 wherein the back pressure is in the range of about 8 - 15 psig.

* * * * *